United States Patent

Hahne

[15] 3,647,131
[45] Mar. 7, 1972

[54] APPARATUS FOR ARRANGING PARALLEL THE EDGES OF STEEL SHEETS TO BE WELDED

[72] Inventor: Siegfried Hahne, Hosel, Germany
[73] Assignee: Messer Griesheim GmbH, Frankfurt/Main, Germany
[22] Filed: Feb. 26, 1970
[21] Appl. No.: 14,400

[30] Foreign Application Priority Data

Mar. 6, 1969 Germany..................P 19 11 324.7

[52] U.S. Cl..................................228/5, 219/124, 228/6, 228/15, 242/77.3
[51] Int. Cl..................................................B23k 1/20
[58] Field of Search..................228/5, 6.5, 15, 44; 219/7.5, 219/124, 128, 155; 242/77.3, 78, 78.1

[56] References Cited

UNITED STATES PATENTS

| | | | |
|---|---|---|---|
| 2,219,049 | 10/1940 | McArthur | 271/2.6 |
| 3,191,843 | 6/1965 | Tomkins | 228/5 |
| 3,198,931 | 8/1965 | Klempay | 219/124 |
| 3,365,144 | 1/1968 | Daub | 242/78.1 |

Primary Examiner—John F. Campbell
Assistant Examiner—R. J. Craig
Attorney—Ernest F. Marmorek

[57] ABSTRACT

The apparatus comprises a sheet-feeding path extending in front of and behind the area of welding in a welding machine. A shearing device for trimming the end edges of the sheets to be welded is located at the input of the feeding path. The welding machine is supported for movement in the direction of the sheet feeding. A vertically adjustable stop beam is arranged in the area of welding, and the movement thereof is synchronized with that of clamping jaws. The clamping jaws clamp each of the two aligned sheets and feed them to the area of welding. A buckle table is provided for each sheet to produce a band thereon. These bands enable a substantially accurately parallel abutment of the sheet edges against the raised stop beam.

5 Claims, 5 Drawing Figures

APPARATUS FOR ARRANGING PARALLEL THE EDGES OF STEEL SHEETS TO BE WELDED

This invention relates in general to the welding of metal sheets. In particular this invention relates to an apparatus for accurately aligning the trimmed end edges of metal sheets which are consecutively fed to a welding machine in order to be welded into a continuous belt.

In the known apparatus of this kind, the end edges are trimmed in a cutting or in a shearing device, then displaced one against the other and the minute gap therebetween, the so-called airgap, is subsequently welded. Due to the fact that in modern welding devices the welding operation itself is carried out according to a predetermined program, it is very important for the quality of the welding seams that the trimmed end edges, prior to the welding, be adjusted exactly in parallel one to another.

It is very difficult, however, to meet this requirement in conventional devices, since even the smallest inaccuracy in the feeding of the two sheets to be welded causes deviations from the exactly parallel adjustment of the welding end edges. As a consequence, such deviations result into a considerably impaired quality of the welded joint. Moreover, the resistance parameters of the welded joint must correspond to those of the remaining sections of the welded sheet belt, since after the completion of the welding operation the belt is usually transferred for a further continuous treatment, such as for the rolling and the like.

Experiments have been made already, with a relatively good success, to solve the aforementioned problems by clamping each end of the two consecutive sheets between a pair of clamping jaws, trimming the end edges during the grip of the jaws and, finally, by welding the trimmed end edges together (German Pat. No. DBP 1,116,034). For the trimming action, there have been employed double cutting shears to insure a symmetrical configuration of the trimmed end edges.

In practice, however, such a combination of the trimming and of the welding operating during a single grip of the sheets has the disadvantage that the welding device must be equipped with the shearing machine. The employment of another trimming operation such as of a milling operation, for example, is relatively rare since milling is time consuming and, therefore, costly. The shearing machine, usually double cutting shears, entails the disadvantage that their structure must be very massive to withstand the extreme forces which occur during the shearing operation. It has been experimentally ascertained, for example, that the weight difference between a welding device with a shearing machine and that without the shearing device amounts approximately to 15 tons. In addition, such a bulky machine must be equipped with correspondingly massive fundaments as well as with efficient power sources such as, for example, with the so-called hydraulic accumulator that is applied for hydraulically operated double cutting shears.

Another disadvantageous aspect of known devices of this type resides in the fact that most of the rolling mills are equipped with cutting means, such as double cutting shears, and the purchase of a further cutting shears for the application in the sheet welding device only, is in a certain sense a duplication.

BRIEF SUMMARY OF THE INVENTION

It is, therefore, an object of this invention to avoid the aforementioned disadvantages of the prior art sheet welding devices.

Another object of this invention is to reduce costs for adjusting parallel the end edges of the sheets to be welded.

Still another object of this invention is to improve the design and operation of the metal sheet welding machine.

According to this invention, the above objects are attained by the provision of a vertically adjustable stop member between the trimmed sheet ends to be welded and, in addition, by feeding the metal sheets to the area of welding in such a manner as to form a loop or wave on each of the two sheets. By means of these loops it is now possible that the small deviations from the feeding direction during the advance of the sheets from the shearing device to the welding area, can be easily corrected with minimum cost. The parallel adjustment of the end edges of the sheets is thereby accomplished by urging the trimmed sheet ends against the stop surfaces of the stop member. It is advantageous to provide this stop member in the form of a vertically adjustable stop beam which can be lowered to the level of the bottom surface of the metal sheets. The upper surface of the stop beam is adapted to serve as a support for the welded beam.

Provided that there is no applicable shearing device in the rolling mill, the edges of this stop beam can be adjusted to work as shearing edges for the metal sheets. If a separate shearing machine is employed for trimming the sheet ends, it is located preferably at the beginning of the sheet feeding path before the welding area of the welding machine. The formation of the loops on the surface of each of the processed sheets succeeds preferably after the completion of the trimming action. More particularly, a buckle table is arranged in the direction of the feeding of the sheets at each side of the welding area in the welding machine, both for the incoming sheet end and for the sheet which is taken up by winding means.

The formation of the waves or of the loops on the processed sheets can be best accomplished by the provision of a horizontal runway, preferably of a rail track, in the direction of the sheet feeding, and movably supporting the welding machine on this rail track.

BRIEF DESCRIPTION OF SEVERAL VIEWS OF THE DRAWING

The invention will now be described by way of an example in the following description, with reference to the accompanying drawing, in which.

DETAILED DESCRIPTION

Figure 1:
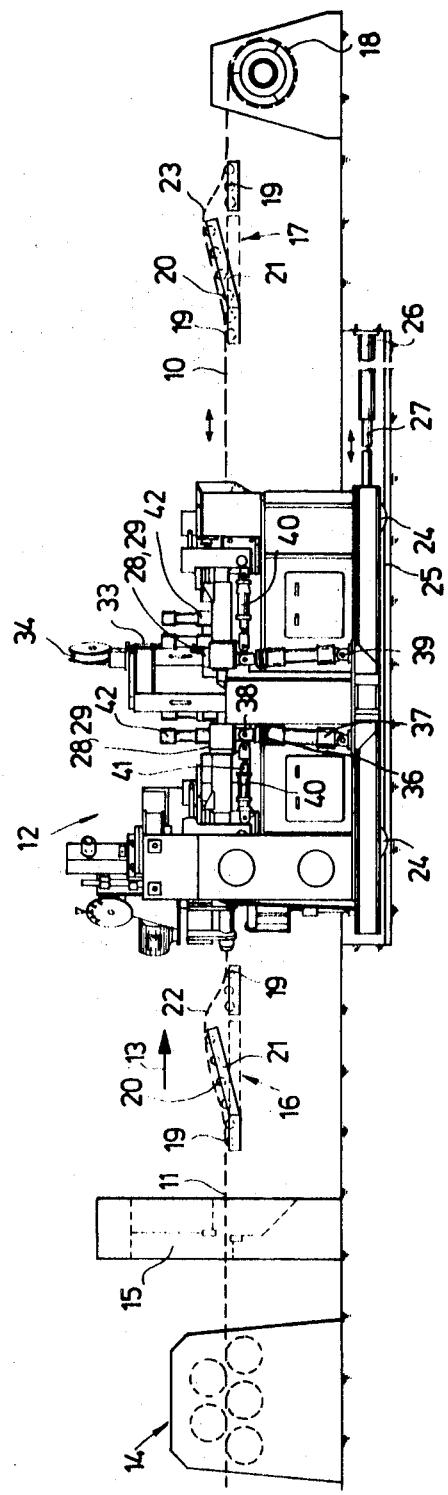
FIG. 1 is a schematic front elevational view of the device according to this invention for aligning parallel and welding together end edges in a succession of metal sheets.

As illustrated in FIG. 1, a first metal sheet 10 is fed past, and a second metal sheet 11 is fed to a welding area in the welding machine 12 where they are to be welded together into a continuous sheet belt. The direction of feeding of the sheets 10 and 11 is designated by the arrow 13. Both of the sheets 10 and 11 consecutively pass through a straightening device 14 which eliminates any unevenness on the sheets. At the following station, the end edges of the successively fed sheets 10 and 11 are trimmed in a shearing device 15. The trimmed sheets are advanced in the direction of the arrow 13 to a position at which the end edges to be welded are at opposite sides of the welding area in the welding machine. A buckle table 16 is arranged in the feeding path between the shearing device 15 and the welding machine 12. Behind the welding machine 12, there is arranged another buckle table 17, over which the first sheet 11 is taken up by the winch 18. Each of the buckle tables 16 and 17 is provided with an upwardly tiltable arm 21, and with feed rollers 19 and 21. The tiltable arms 21 serve for the initiating of the creation of the waves or loops 22 and 23 of the sheets to be aligned in parallel.

The welding machine 12 is movably supported on wheels 24 and is guided on horizontal rails 25 in the direction of the feeding of the sheets. The movement of the welding machine 12 on the rails 25 is controlled by a pneumatic piston 27 and by a pneumatic cylinder 26. The welding machine 12 can be displaced, therefore, at different speeds back and forth in the directions as indicated by double arrows.

Figure 2:
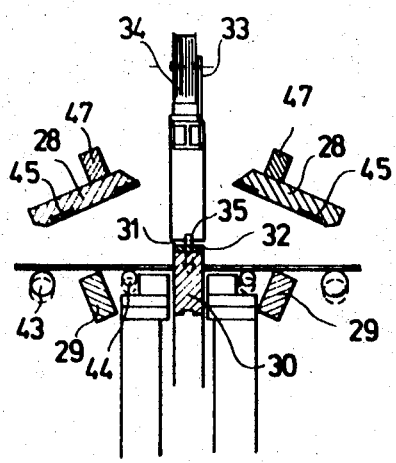
FIG. 2 is a fragmentary side elevational view, partly in section, of the end edges aligning mechanism in the welding machine of FIG. 1, illustrating the stop member in its end edges aligning position.
Figure 3:
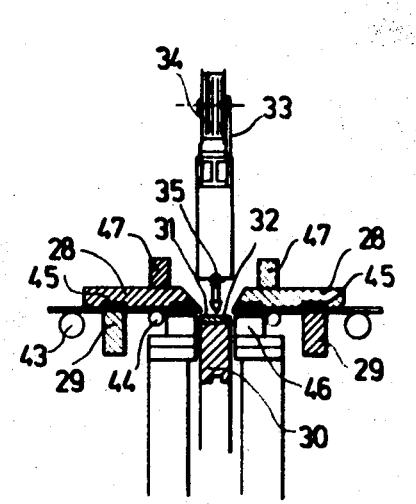
FIG. 3 is the same view of the aligning mechanism as shown in FIG. 2 at a clamped position immediately prior to the welding operation.
Figure 4:
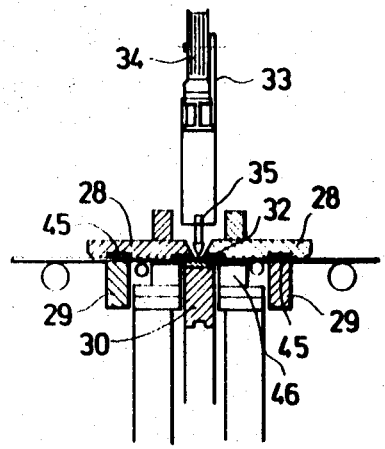
FIG. 4 is the same view of the sheet aligning mechanism as that of FIG. 3, and illustrating the welding position of this mechanism.

According to another feature of this invention, two pairs of clamping jaws 28 and 29 are operatively associated with the welding mechanism, as it is shown in greater detail in FIGS. 2 to 4. The welding equipment itself is not shown in the drawing. It can be of any suitable conventional type such as, for instance, a shielded arc welding device operating with or without the application of a filler metal, or a gas welding equipment. In FIGS. 2 to 4, there is also illustrated a vertically movable stop member 30 which in the preferred embodiment is in the form of a vertically adjustable beam. At the lowered position of the stop beam 30, the upper surface thereof is leveled with the bottom surface of the sheets 10 and 11, and serves as a supporting plane for the welded seam. For this purpose, the upper portion of the stop beam 30 is preferably provided with a cuprous coating 32, and cooperates with the upper clamping jaws 28, as it will be described hereinafter. Above the area of the coating 32, a vertical frame 33 is arranged for supporting a guiding member for the welding burner 35, as well as for guide means for the filler metal 34 if it is so desired.

Figure 5:
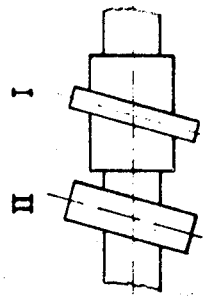
FIG. 5 is a schematic fragmentary plan view of the sheet feeding path and illustrating the angular position of the trimming cutter and of the stop beam.

To grip firmly the opposed end edges of the trimmed sheets 10 and 11, the aforementioned pairs of the upper clamping jaws 28 cooperate with corresponding pairs of the lower clamping jaws 29. As schematically shown in FIG. 5, the angular position II of shearing means is an oblique position with respect to the axis of the feeding path. Preferably, the shearing device 15 is inclined about 83°. Accordingly, the angular position I of the stop beam 30 is inclined at the same angle. In order to control the vertical movement of the lower clamping jaws 29, pneumatically operated pistons 36 in pressure cylinders 37 are jointed at points 38 and 39 between these lower jaws 29 and the bottom frame of the welding machine 12. Sets of disk-shaped springs can be suitably arranged between respective pistons 36 and cylinders 37 to compensate the weight of the entire clamping mechanism during the released condition of the pneumatic controlling pistons 36 and cylinders 37. In addition, to adjust the horizontal position of the clamping jaws 28 and 29, there are provided horizontally directed, pneumatically operated controlling pistons 41 with cylinders 40. As it will be explained in detail below, the pistons 41 are employed for feeding from opposite directions the end edges of the trimmed sheets against the stop surfaces of the lifted stop beam 30 and, subsequently, when the stop beam 30 has been lowered, to shift the aligned and clamped end edges in abutment with each other above the coating 32.

It is desired, of course, that a central control pressure system be provided for controlling the movements of respective movable parts of the welding machine 12. More specifically, such a central control system should control the vertical and horizontal displacements of the pairs of clamping jaws 28 and 29, as well as the vertical adjustment of the stop beam 30. Moreover, this central pressure system can be also employed for an additional adjustment of the jaw pairs in the traverse horizontal direction in order to arrange parallel the lateral edges of the sheets in the middle portions thereof, for example. Even for this kind of operation, pneumatic control means can be applied. By means of this pneumatic control means, such as the previously described pistons in pressure cylinders, the traverse alignment of the sheets can be carried out with a substantially greater exactness than by the application of conventional vertical rolls. Due to the absence of conventional edge trimming and aligning devices, the total length of the welding apparatus according to this invention can be considerably reduced.

Referring back to FIG. 1, there are illustrated control pressure cylinders 42 with corresponding pistons (not shown) that are jointed to the upper clamping jaws 28 for controlling the vertical position of the latter. The pressure cylinders 42 are controlled in concert with the cylinders 37 for the lower clamping jaws 29.

The mode of operation of the welding apparatus according to this invention is as follows:

As shown in FIG. 2, the welding process is initiated at the disengaged position of the pairs of the clamping jaws 28 and 29, and at the raised position of the vertically adjustable stop beam 30. At this position, the end edges to be welded are first fed in abutment against the opposed stop surfaces of the stop beam 30. This abutment can be accomplished by moving the welding machine 12 on the rails 25 at a speed which slightly exceeds the speed of the advance of the taken-up sheet 10. Subsequently, to bring the front end edge of the incoming sheet 11 in abutment against the stop beam 30, the speed of the welding machine 12 is slightly reduced with respect to the speed of the feeding of this incoming sheet 11. Due to these combined movements, waves or loops 22 and 23 will result on each of the sheets 10 and 11. The waves 22 and 23 will occur at those surface portions of the sheets 10 and 11 that are in contact with the tiltable arms 20 of the buckle tables 16 and 17. The loops 22 and 23 make it possible that the end edges of the sheets 10 and 11 are stopped exactly in parallel with the stop surfaces of the stop member 30. During the proper welding operation, the welding machine 12 is moved synchronously with the speed of the advance of the welded sheets. Prior to this welding phase, however, when the end edges are being aligned, the clamping pairs of jaws 28 and 29 are disengaged from the sheets 10 and 11 so that the latter can freely be moved on the supporting rollers 43 and 44.

As soon as the parallel adjustment of the end edges against the stop beam 30 is completed, the clamping jaws 28 and 29 are activated to grip firmly the aligned sheets. Simultaneously, the stop beam 30 is displaced downwardly between the vertical guiding columns 46 (FIG. 3). At the lowered position of the stop beam 30, the cuprous coating thereof is situated at the same level as the bottom of the sheets to be welded.

To insure a reliable clamping effect, the upper jaws 28 are provided at the working bottom surface thereof with friction inserts 45 that have a high coefficient of friction. One insert 45 is located opposite to the lower clamping jaw 29. Another insert 45 is disposed in the area of a second clamping site at the end of the protruding portion of the upper jaw 28. The actuation of this second clamping site is effected through a reinforcing member 47, as it will be explained in subsequent paragraphs with reference to FIG. 4. Upon the completion of the parallel arrangement of the end edges, the latter are spaced apart one from the other about the breadth of the removed stop beam 30 (FIG. 3). For the proper welding, however, it is necessary that the parallel edges be brought in contact with each other at the area of welding. This movement is effected by displacing in opposite horizontal directions the actuated pairs of the clamping jaws 28 and 29 together with the clamped sheets 11 and 10, into the proper welding position as shown in FIG. 4. At that position, the second clamping areas at the tips of the jaws 28 are engaged via reinforcement members 47 with the sheet portions opposite to the lowered coating 32 of the stop beam 30. At the same time, the stop beam counteracts the pressure from underneath. The parallel sheet ends are thus clamped in their welding position and the proper welding by means of the burner 35 can be initiated.

I wish it to be understood that I do not desire to be limited to the exact details of constructions shown and described, for obvious modifications will occur to a person skilled in the art.

Having thus described the invention, what I claim as new and desire to be secured by Letters Patent, is as follows:

1. An apparatus for arranging parallel the end edges of metal sheets to be welded while moving in a sheet feeding path comprising in combination welding means; said sheet feeding path being adapted for said sheets to be fed in one feeding direction before and after said welding means;

a vertically adjustable stop member disposed in said welding means having opposite surfaces, and being operable to move between a projected position wherein it extends into said path for abutment by the end edges of said metal sheets and, respectively, a retracted position wherein it clears said path;

said welding means being movably supported for movement at an adjustable speed in said feeding direction;

means operative for bending said sheets to enable a substantially accurately parallel abutment of said sheets against the opposite stop surfaces of said stop member, and shearing means disposed at the beginning of said sheet feeding path to trim said end edges to be welded.

2. An apparatus for arranging parallel the end edges of metal sheets to be welded while moving in a sheet feeding path comprising in combination welding means; said sheet feeding path being adapted for said sheets to be fed in one feeding direction before and after said welding means;

a vertically adjustable stop member disposed in said welding means having opposite surfaces, and being operable to move between a projected position wherein it extends into said path for abutment by the end edges of said metal sheets and, respectively, a retracted position wherein it clears said path;

said welding means being movably supported for movement at an adjustable speed in said feeding direction and means operative for bending said sheets to enable a substantially accurately parallel abutment of said sheets against the opposite stop surfaces of said stop member, wherein said means for bending said sheets are buckle tables disposed in said sheet feeding path before and after said welding means, respectively.

3. An apparatus for arranging parallel the end edges of metal sheets to be welded while moving in a sheet feeding path comprising in combination welding means; said sheet feeding path being adapted for said sheets to be fed in one feeding direction before and after said welding means;

a vertically adjustable stop member disposed in said welding means having opposite surfaces, and being operable to move between a projected position wherein it extends into said path for abutment by the end edges of said metal sheets and, respectively, a retracted position wherein it clears said path;

said welding means being movably supported for movement at an adjustable speed in said feeding direction;

means operative for bending said sheets to enable a substantially accurately parallel abutment of said sheets against the opposite stop surfaces of said stop member, and clamping means operatively coordinated with said stop member to grip said sheets when the parallel alignment of the end edges thereof has been completed.

4. The apparatus according to claim 3 wherein said clamping means feed from opposite directions the aligned parallel sheets into said welding means.

5. The apparatus according to claim 4, said stop member having a top surface which at the lowered position, is at the same level as the bottom surface of said sheets to be welded and cooperates with said clamping means to serve as a counteracting support for said end edges to be welded.

* * * * *